Oct. 25, 1966
J. W. REEDS, JR
3,281,684
NULL TYPE AND DIRECT READING METER WITH CONTINUOUSLY
ADJUSTABLE RANGE HAVING METER SCALE
COUPLED TO POTENTIOMETER ARM
Filed April 16, 1962
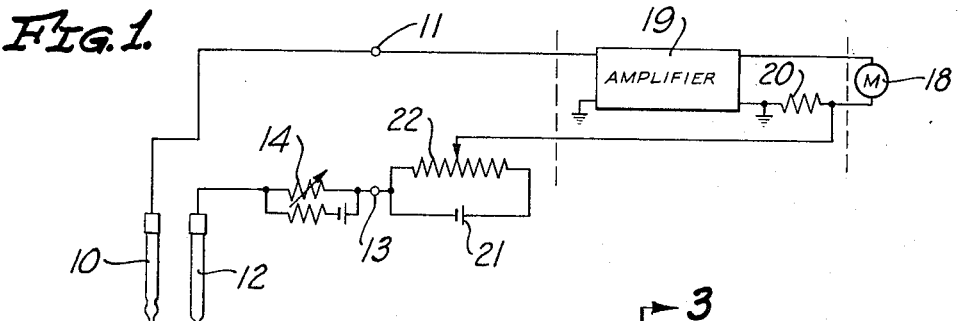
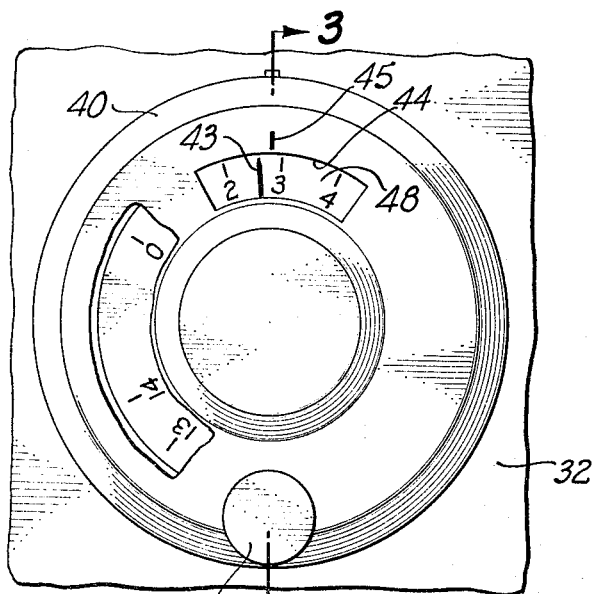
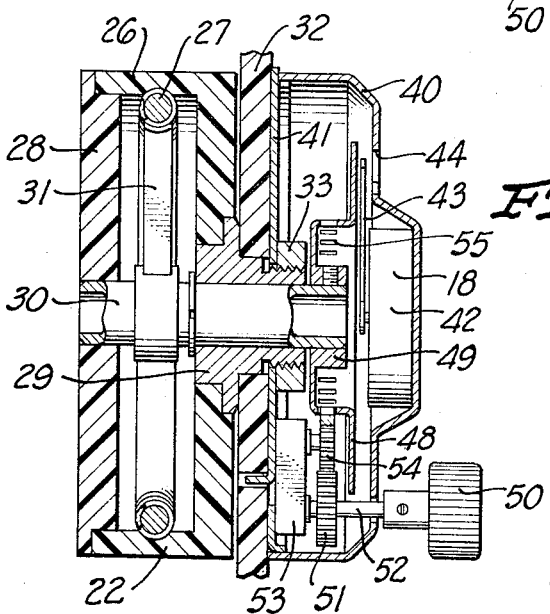
INVENTOR.
JOHN W. REEDS, JR.
BY HIS ATTORNEYS
HARRIS, KIECH, RUSSELL & KERN

United States Patent Office 3,281,684
Patented Oct. 25, 1966

3,281,684
NULL TYPE AND DIRECT READING METER WITH CONTINUOUSLY ADJUSTABLE RANGE HAVING METER SCALE COUPLED TO POTENTIOMETER ARM
John W. Reeds, Jr., La Habra, Calif., assignor to Beckman Instruments, Inc., a corporation of California
Filed Apr. 16, 1962, Ser. No. 187,593
1 Claim. (Cl. 324—98)

This invention relates to electrical metering systems and, in particular, to a meter circuit with a continuously adjustable range. The meter circuit of the invention is especially adapted for use with pH measurements but is also applicable to other voltage measurements particularly where a high impedance measuring system is desirable.

Null-type meter systems are used extensively where extremely high accuracy is desired. In the null-type system, the input signal is connected in opposition to a reference voltage and the difference between the two voltages is determined by a meter connected therebetween. Often an amplifier will be used to provide increased sensitivity for driving the meter. The reference voltage is varied to bring the meter indication to zero or a null. The adjusting means for the reference voltage is calibrated and the setting for the null condition is a measure of the input signal. This type of measurement is extremely accurate as amplifier, meter and other circuit errors are eliminated. The accuracy of the measuring system is primarily controlled by the accuracy of the reference voltage and the calibration.

The null or potentiometric meter system has one serious drawback in the length of time ordinarily required to obtain an accurate null adjustment. The setting is normally achieved by trial and error with a waiting time required between each change in setting for the system to stabilize. In many metering applications, higher speed reading is of greater importance than maximum accuracy and direct reading circuits are used. In such a system, the meter is provided with a scale appropriately calibrated and the input signal is indicated by the position of the needle along the scale. An amplifier stabilized by high negative feedback is often used in the direct reading meter system.

It is an object of the present invention to provide a new and improved meter circuit which provides for direct reading and for null-type reading in a single instrument. A further object is to provide such an instrument which may be operable in either manner without requiring any switching or changing of mode or circuitry. A further object is to provide such an instrument having only a single adjustment control and only a single scale to read.

It is an object of the invention to provide a meter circuit with continuously adjustable range for null and scale readings and including an amplifier, a meter movement with the coil connected as an output load on the amplifier, a potentiometer connected across a voltage source to provide a variable voltage between an arm and one terminal of the potentiometer, a pair of input terminals, circuit means for connecting at least a portion of the amplifier output voltage with the potentiometer variable voltage across the input terminals to provide a bucking voltage, a housing having an index mark for indicating minimum input to the meter, a meter scale positioned for traverse by the needle with the scale being movable relative to the index mark and with the scale indicia being a function of the output signal, and means for moving the potentiometer arm and meter scale in synchronism to position at the index mark the scale indicia corresponding to the potentiometer arm setting so that the needle position on the scale is an indication of input signal magnitude and with the needle being positionable at the index mark by moving the potentiometer arm and meter scale.

It is a particular object to provide such a meter circuit utilizing a rotary potentiometer and a meter scale carried on a common shaft with the two units being operated in synchronism by a single control knob. A further object is to provide such a structure which may use a single turn potentiometer or a multiturn potentiometer as desired. If a multiturn potentiometer is used, a scroll type multiturn meter scale may be used. It is an object of the invention to provide a meter circuit including an amplifier, a meter movement with a needle deflectable from an index mark by the amplifier output, means for generating a variable reference voltage, a pair of input terminals, circuit means for connecting at least a portion of the amplifier output voltage with the variable reference voltage across the input terminals to provide a bucking voltage, a meter scale positioned for traverse by the needle with the scale being movable relative to the needle and index mark and with the scale indicia being a function of the input signal, and means for varying the reference voltage and moving the meter scale in synchronism. Another object is to provide such an instrument in which the needle is brought to a null aligned with the index mark by moving the meter scale with the needle position on the meter scale providing the desired output indication. A further object is to provide such an instrument in which the magnitude of input signal may be read from the needle position on the scale for any position of the needle.

The invention also comprises novel details of construction and novel combinations and arrangements of parts, which will more fully appear in the course of the following description. The drawing merely shows and the description merely describes a preferred embodiment of the present invention which is given by way of illustration or example.

In the drawing:

FIG. 1 is a schematic diagram of a preferred embodiment of the meter circuit;

FIG. 2 is a front view of the meter of FIG. 1; and

FIG. 3 is a sectional view taken along the line 3—3 of FIG. 2.

The circuit of FIG. 1 illustrates a pH meter incorporating the meter circuit of the invention, with a glass electrode 10 connected to an input terminal 11 and a reference electrode 12 connected to an input terminal 11 and a reference elecrode 12 connected to an input 13 through an asymmetry potential control circuit 14. Asymmetry potential circuits are conventional in pH meters and for example, may comprise a series combination of a battery and a resistance with a variable resistance connected in parallel with the series combination.

A meter 18 with a conventional coil and needle structure is connected as an output load on an amplifier 19, preferably in series with a resistor 20. A reference voltage source comprising a battery 21 connected across a potentiometer 22 is connected between one of the input terminals, here the terminal 13, and the junction of the meter 18 and resistor 20 to provide a feedback connection for the amplifier. The other input terminal 11 is connected directly to the amplifier input.

The preferred construction for the meter 18 and potentiometer 22 is shown in FIGS. 2 and 3. The potentiometer may be a conventional single turn unit including a case 26 with a wound resistance element 27 positioned therein, a back 28, a mounting bushing 29, and a rotating shaft 30. The shaft is journalled in the bushing and back and carries an arm 31 for electrically contacting the resistance element. The potentiometer may be mounted on a panel 32 by a nut 33. While the potentiometer is shown here as a single turn rotary potentiometer, it should be noted that a multiturn potentiometer or a linear potentiometer may be utilized in the practice of the invention.

The meter 18 includes a housing 40 fixed to a back 41 which is also clamped to the panel 32 by the nut 33. A meter movement 42 is carried in the housing with a needle 43 appearing at an opening 44 in the face of the housing. An index mark 45 is provided on the housing for the zero or null position of the needle 43.

A meter scale which is movable in synchronism with the arm 31 of the potentiometer is provided in the meter housing. In the preferred form shown herein, a circular face 48 is carried from a hub 49 for positioning behind the opening 44 of the housing. The hub is mounted on the potentiometer shaft 30 by a set screw or the like for rotation with the potentiometer arm. Indicia may be provided on the scale in any suitable form, depending upon the particular application of the meter circuit. In the pH meter system shown herein, the meter scale is calibrated in pH units over the range of zero to fourteen.

Means are provided for rotating the shaft 30 to vary the reference voltage and vary the position of the meter scale relative to the index mark and needle. In the preferred form shown herein, a knob 50 projecting from the face of the housing drives a gear 51 via a shaft 52 journalled in a block 53 on the back 41. The gear 51 drives an idler gear 54 journalled in the block 53, with the idler gear in turn driving the meter scale 48, the gear teeth engaging mating slots 55.

When an input signal is connected to the input terminals 11, 13, the meter needle will be deflected to some degree, depending upon the magnitude and polarity of the input signal. A null type reading may be made by manually rotating the knob 50 in a direction which causes the needle 43 to move toward the index mark 45. Adjustment of the knob 50 is continued until the needle is exactly in line with the index mark. The system is now at a null with the feedback voltage equal to zero and the reference voltage balancing the input signal. The magnitude of the input signal or here, the pH of the sample, is determined by noting the reading on the scale 48 opposite the index mark 45. This type of reading provides the maximum accuracy achievable with the null type system.

If a fast but less accurate reading is desired, the knob 50 is rotated merely to bring the needle within the opening 44 and the scale is read using the needle as the indicator. Error due to nonlinearity in the meter movement will appear in this type of reading, but a direct or immediate reading is obtained.

Thus it is seen that both direct reading operation and null-type operation are achieved with the single meter circuit and without requiring any switching or change of mode or circuitry. The operator may use the meter circuit for direct reading by merely visually observing the position of the needle. Then when he desires a more accurate reading, he adjusts the knob to bring the needle to the index mark.

It should be noted that the instrument offers several specific advantages over conventional instruments. When used as a null balance instrument, small changes in the input signal may be observed without having to rebalance the instrument, since for very small deflections of the meter movement, non-linearity errors are insignificant. When used as a direct reading instrument, a continuously adjustable range is provided, giving great flexibility.

Although an exemplary embodiment of the invention has been disclosed and discussed, it will be understood that other applications of the invention are possible and that the embodiment disclosed may be subjected to various changes, modifications and substitutions without necessarily departing from the spirit of the invention.

I claim as my invention:

In a meter circuit for measuring the magnitude of an input signal, said circuit having a continuously adjustable range for providing both direct readings of said input signal magnitude and a null reading, the combination comprising first and second input terminals, said input signal being applied across said terminals;

a meter movement including a coil and a movable indicating needle;

a resistor;

an amplifier having an input connected to said first input terminal and having a pair of output terminals, said meter coil and said resistor being serially connected as a load across said amplifier output terminals;

means for providing a feedback signal for bucking said input signal including a circuit for generating a reference voltage comprising a potentiometer having a movable arm and having a pair of end terminals connected across a voltage source, said reference voltage being generated across one of said end terminals and said arm, said arm being connected to the junction of said meter coil and said resistor, said one end terminal being connected to said second input terminal; and means for carrying said potentiometer and said meter movement including a housing having an index mark for indicating the null position of said needle and an opening immediately below said mark for viewing the position of said needle;

a meter scale mounted in said housing adjacent said meter movement for traverse by said needle, said scale being movable relative to said index mark and having indicia being a function of said input signal;

means coupling said meter scale and said potentiometer arm; and means coupled to said meter scale for driving said scale and said arm in synchronization and varying said reference voltage, whereby the position of said needle relative to said scale, when said needle appears in said opening, provides said direct reading of said input signal magnitude and said null reading when said needle is in line with said index mark.

References Cited by the Examiner

UNITED STATES PATENTS

| | | | |
|---|---|---|---|
| 1,593,626 | 7/1926 | Foote | 324—98 |
| 1,949,600 | 3/1934 | Bucky | 324—98 |
| 2,617,842 | 11/1952 | Fink | 324—99 |
| 2,802,174 | 8/1957 | Staunton. | |

WALTER L. CARLSON, *Primary Examiner.*

FREDERICK M. STRADER, *Examiner.*

D. D. GREENE, J. J. MULROONEY,
*Assistant Examiners.*